United States Patent [19]

Khoe

[11] Patent Number: 4,824,195
[45] Date of Patent: Apr. 25, 1989

[54] MONOMODE OPTICAL TRANSMISSION FIBRE HAVING A TAPERED END PORTION PROVIDED WITH A LENS AND METHOD OF MANUFACTURING SUCH A FIBRE

[75] Inventor: Giok D. Khoe, Eindhoven, Netherlands

[73] Assignee: U.S. Philips Corp., New York, N.Y.

[21] Appl. No.: 153,531

[22] Filed: Feb. 2, 1988

Related U.S. Application Data

[63] Continuation of Ser. No. 801,369, Nov. 25, 1985, abandoned.

[30] Foreign Application Priority Data

Dec. 24, 1984 [NL] Netherlands ............... 8403931

[51] Int. Cl.$^4$ ............................................. G02B 6/32
[52] U.S. Cl. ................................. 350/96.18; 350/96.15; 350/320
[58] Field of Search ............... 350/96.12, 96.15, 96.16, 350/96.18, 96.20, 96.29, 96.30, 320

[56] References Cited

U.S. PATENT DOCUMENTS 4,118,270 10/1978 Pan et al. ................. 350/96.18 X
4,137,060 1/1979 Timmermann ............... 350/96.18 X
4,193,663 3/1980 Timmermann ............... 350/96.18
4,671,609 6/1987 Khoe et al. ................. 350/96.18

FOREIGN PATENT DOCUMENTS 2625097 4/1982 Fed. Rep. of Germany .

OTHER PUBLICATIONS

D'Auria et al, "High Index Microlenses for GaAlAs Laser-Fibre Coupling", *Electronics Lett.*, vol. 16, No. 9, Apr. 1980, pp. 322-324.
Khoe et al, "Efficient Coupling of Laser Diodes to Tapered Monomode Fibres with High-Index End", *Electronics Lett.*, vol. 19, No. 6, Mar. 1983, pp. 205-207.

*Primary Examiner*—John D. Lee
*Attorney, Agent, or Firm*—William L. Botjer

[57] ABSTRACT

A monomode optical transmission fibre (1) is described, having a tapered end portion (5) on which a lens (10) is arranged. This lens is obtained by immersing the fibre end in a transparent liquid material (7) whose melting temperature is lower than that of the fibre materials and whose refractive index is substantially equal to that of the fibre core (2), and by allowing the drop which adheres to the fibre after withdrawal to solidify.

9 Claims, 1 Drawing Sheet

MONOMODE OPTICAL TRANSMISSION FIBRE HAVING A TAPERED END PORTION PROVIDED WITH A LENS AND METHOD OF MANUFACTURING SUCH A FIBRE

This is a continuation of application Ser. No. 801,369, filed Nov. 25, 1985, now abandoned.

BACKGROUND OF THE INVENTION

The invention relates to a monomode optical transmission fibre whose end portion has a tapered core and cladding, on which end portion a lens made of transparent material and having a spherical surface is arranged. The invention also relates to a method of manufacturing such a transmission fibre.

Such a transmission fibre and method are known from the article "Efficient Coupling Of Laser Diodes To Tapered Monomode Fibres With High-Index End" in *Electronics Letters,* vol. 19, no. 6, March 1983, pages 205–207. As described in this article, monomode transmission fibres with a tapered core and cladding, in comparison with transmission fibres with a straight and flat end portion, have substantially better properties as regards coupling efficiency, permissible offset of the fibre relative to a radiation source, which is for example a diode laser, and the feedback of radiation to the radiation source as a result of reflections inside the fibre.

The coupling efficiency is to be understood to mean the quotient of the radiation intensity received from the source by the transmission fibre and the total radiation intensity of this source.

As a result of the feedback effect a part of the radiation emitted by the diode laser can re-enter the diode laser. This feedback may give rise to an undesired modulation of the radiation emitted by the diode laser.

The coupling efficiency can be increased substantially by providing the tapered end portion of the monomode transmission fibre with a lens. As is described in the above mentioned article, this lens can be formed by immersing the tapered end portion of the fibre in a liquid transparent material, withdrawing the tapered end portion from the liquid material, and allowing the material which has adhered to the fibre end to solidify until a solid lens shape is formed. In said article it is stated that the refractice index of the lens material should be substantially higher than that of the core material, as a requirement to obtain an adequate numerical aperture for the combination of fibre end and lens. Owing to the large difference between the refractice index of the lens and that of the fibre core reflections at the lens-fibre interface may occur, which may give rise to feedback to the radiation source and a reduced coupling efficiency.

SUMMARY OF THE INVENTION

The present invention provides a monomode transmission fibre having a tapered core and cladding and provided with a fused-on lens, which does not exhibit said reflections and which, surprisingly provides an adequate coupling efficiency. The monomode transmission fibre in accordance with the invention is characterized in that the lens is made of a material whose melting temperature is lower than that of the transmission fibre materials and whose refractive index is substantially equal to that of the core material.

Since the refractive index of the lens material is substantially equal to that of the core material, the likelihood of feedback as a result of reflection from the lens-fibre interface is minimal.

It is to be noted that it is known per se from German Patent Specification No. 2,625,097 to arrange a lens on the end face of an optical transmission fibre, which lens is made of a material having a melting temperature which is lower than that of the fibre materials. However, the fibre described in said German Patent Specification is not a monomode fibre whose core has a tapered end portion but a multimode fibre having a straight core end portion. Before the lens is fused to the fibre in accordance with said German Patent Specification No. 2,625,097, in the cladding should be removed partly from said fibre over a specific length by etching. This etching demands an additional process step. Moreover, the etching liquid may affect other portions of the transmission fibre.

The end face of the transmission fibre in accordance with German Patent Specification No. 2,625,097 on which the lens is to be arranged has a diameter larger than 50 $\mu$m. When quartz glass is used for the fibre material and a soft glass is used for the lens material, lens may become detached from the transmission fibre owing to the difference in expansion coefficients, particularly if the interface is relatively large. In the case of the monomode transmission fibre in accordance with the invention, where the diameter of the interface is between 15 and 30 $\mu$m, the risk of the lens becoming detached is substantially smaller.

A preferred embodiment of the monomode transmission fibre is characterized further in that the lens material is glass.

Preferably, the outer surface of the lens is provided with an antireflection coating.

A preferred embodiment of the transmission fibre is characterized further in that the length of the tapered end portion is of the order of magnitude of the diameter of the straight fibre portion. Such a transmission fibre has a better coupling efficiency than a transmission fibre whose tapered end portion is substantially longer.

The lens may be arranged on a spherical end face of the tapered fibre. However, suitably the lens is arranged on a flat end face of the tapered end portion of the transmission fibre.

Another aspect of the invention concerns the method of manufacturing the monomode transmission fibre. As is described in said article in *Electronics Letters,* vol. 19, no. 6, p. 205–207, a monomode optical transmission fibre having a tapered end portion provided with a lens can be obtained by stretching a straight transmission fibre in an arc discharge until it fractures, subsequently immersing the tapered end portion in a liquid transparent material, withdrawing the tapered end portion from the liquid material and finally allowing the material which has adhered to the fibre end to solidify until a solid lens shape is obtained.

The method in accordance with the invention is characterized in that the tapered end portion is immersed in a liquid transparent material whose melting temperature is lower than that of the fibre materials and whose refractive index is substantially equal to that of the fibre core.

Preferably, before the tapered end portion is immersed in the liquid material, this end portion is provided with a flat end face.

BRIEF DESCRIPTION OF THE DRAWING

Embodiments of the invention will now be described in more detail, by way of example, with reference to the accompanying drawing, in which.

DESCRIPTION OF THE PREFERRED EMBODIMENTS

Figure 1:
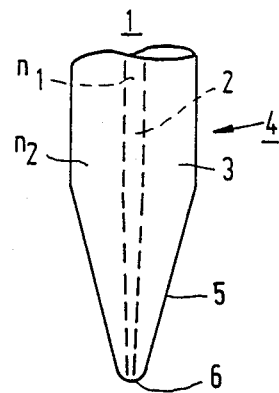
FIG. 1 shows a known monomode transmission fibre having a tapered end portion.

The transmission fibre 1 in FIG. 1 comprises a core 2 and a cladding 3. The refractive index of the core material differs slightly from that of the cladding material, so that most of the light which enters the fibre core can propagate through the core via the mechanism of total reflection from the core-to-cladding interfaces. The refractive index $n_2$ of the cladding material is for example 1.47 if this material is quartz, while the refractive index n, of the core material is, for example, approximately 0.3% higher. The present transmission fibre is a monomode fibre, which means that only radiation of a specific mode can propagate in the fibre core. For such a fibre the diameter of the core is substantially smaller than the diameter of the cladding. For example, the one diameter is approximately 7 microns and the cladding diameter is approximately 125 microns.

The greater part 4 of the transmission fibre is straight. However, the end portion 5 is tapered and has a spherical tip 6. This spherical tip is obtained automatically when a straight transmission fibre is stretched in arc discharge until the straight fibre fractures. The shape of the tapered end portion and the radius of the spherical tip 6 depend on the rate of stretching. The spherical tip has a radius of for example 12.5 microns and exhibits a lens action.

Figure 2:
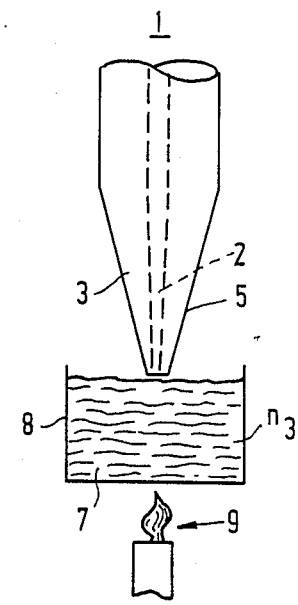
FIG. 2 illustrates the inventive method of providing a fibre end with a lens.

In accordance with the invention, in order to increase the coupling efficiency, a lens is arranged on the end portion 5 of the fibre, so that the effective entrance aperture of the fibre is enlarged. First of all care is taken that the portion 5 is given a flat end face 11, as shown in FIG. 2, and subsequently as is also shown in FIG. 2, the end portion 5 is immersed in a liquid or viscous material 7.

Suitably, the material 7 is a glass which has been melted in a crucible 8, as is schematically represented by the flame 9. Essential is that the temperature of the liquid glass is lower than the melting temperature of the fibre core or cladding, so that the fibre parameters have not changed after immersion. This glass may be for example of the type Bk1, Bk3 or Tlk1. A type of glass must be chosen whose refractive index does not decrease substantially when it is softened and subsequently cooled.

When the fibre end is withdrawn fron the crucible a part of the material 7 will adhere to the fibre. As a result of the surface tension, this material, in the case of specific viscosity, will become drop-shaped, as indicated by the reference numeral 10 in FIG. 3. The dimension and shape of this drop can be influenced by the immersion depth and the temperature of the material 7 in the crucible 8.

After the fibre end 5 with the drop 10 has been withdrawn from the material 7, the drop is allowed to cool. Thus, a lens 10 is formed on the flat end face 11 of this transmission fibre.

In order to obtain such a flat end face the fibre shown in FIG. 1, manufactured by means of the known method, may be cut at a specific location of the tapered end portion 5.

Figure 4:
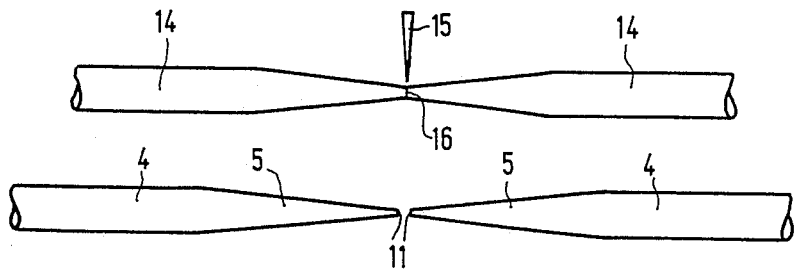
FIG. 4 illustrates how a transmission fibre having a tapered end portion with a flat end face can be obtained.

The upper part of FIG. 4 schematically illustrates a method which is preferably used for obtaining a tapered transmission fibre having a flat end face. Again a straight transmission fibre is used which is first stretched over a specific length. In the fibre 14 thus obtained a scratch 16 is formed by means of a scribing tool 15 of a circular scriber. Subsequently the fibre 14 is stretched further until it fractures, the fracture surface being flat at the location of the scratch. In this way two tapered fibres 4 having flat end faces are formed, as is shown in the lower part of FIG. 4.

When the straight transmission fibre is stretched it is possible to pull at both ends of this fibre. However, it has been found that better results are obtained if one end of the straight fibre is immobilized and the pulling force is applied to the other fibre end. Of the fibre parts obtained after fracturing the straight fibre the part which was immobilized has a substantially shorter tapered end portion (for example 125 micron) than the fibre part to which the pulling force was applied. The transmission fibre with a shorter tapered end portion has a higher coupling efficiency than a transmission fibre having a longer tapered end portion.

Figure 3:
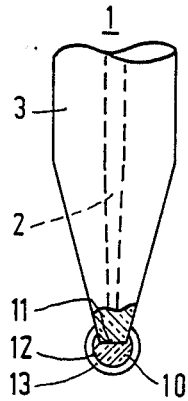
FIG. 3 shows a preferred embodiment of a transmission fibre manufactured in accordance with this method.

The lens, obtained in accordance with the method illustrated in FIG. 2 is made of a homogeneous material having a comparatively high refractive index. The surface of this lens may reflect a part of the incident light. In order to reduce reflection losses an antireflection coating 13 may be applied to the outer surface 12 of the lens 10, as is shown in FIG. 3.

In a realized embodiment of a transmission fibre having a core diameter of approximately 7 microns, a cladding diameter of approximately 125 microns, a refractive index of approximately 1.47, and a short tapered end portion with a flat end face provided with a lens having a diameter of approximately 25 microns and a refractive index of approximately 1.47, a coupling efficiency of over 55% was obtained.

What is claimed is:

1. A monomode optical transmission fibre comprising a core surrounded by a cladding, the fibre having a straight portion terminating in a uniformly tapered portion which extends completely to one end of the fibre; and a spherical lens contacting said end of the fibre and consisting of a droplet of transparent material solidified thereon from the liquid state, such droplet having a diameter substantially larger than the diameter of said core at said end of the fibre; characterized in that said lens material has a melting temperature which is lower than that of either said core material or said cladding material and a refractive index which is substantially equal to that of said core material.

2. A monomode optical transmission fibre as claimed in claim 1, characterized in that the lens material is glass.

3. A monomode optical transmission fibre as claimed in claim 1 or 2, characterized in that the outer surface of the lens is provided with an antireflection coating.

4. A monomode optical transmission fibre as claimed in claim 1, characterized in that the length of the tapered end portion is of the order of magnitude of the diameter of the straight fibre portion.

5. A monomode optical transmission fibre as claimed in claim 1, characterized in that the lens is arranged on a flat end face of the tapered end portion of the transmission fibre.

6. A method of manufacturing a monomode optical transmission fibre as claimed in claim 1, in which a straight transmission fibre having a core surrounded by a cladding is stretched in an arc discharge until the fibre fractures, so that a fibre having a uniformly tapered end portion extending completely to one end of the fibre is obtained, the tapered end portion is immersed in a liquid transparent material, the tapered end portion is withdrawn from the liquid material and the material which has adhered to the fibre end is allowed to solidify until a solid lens shape is obtained; characterized in that the tapered end portion is immersed in a liquid transparent material having a melting temperature which is lower than that of either said core material or said cladding material and having a refractive index which is substantially equal to that of said core material.

7. A method as claimed in claim 6, characterized in that before the tapered end portion of the transmission fibre is immersed in the liquid material, its end portion is provided with a flat end face.

8. A method as claimed in claim 7, characterized in that a tapered fibre having a flat end face is obtained by first stretching a straight transmission fibre, subsequently forming a circular scratch on this fibre and finally stretching the fibre further until it fractures at the location of the scratch.

9. A method as claimed in claim 6, 7 or 8, characterized in that during stretching of the transmission fibre the pulling force is applied to only one end of this fibre, so that the tapered end portion of one of the two transmission fibres thus obtained is substantially shorter than that of the other transmission fibre.

* * * * *